US005758897A

United States Patent [19]

Kueschall

[11] Patent Number: 5,758,897

[45] Date of Patent: Jun. 2, 1998

[54] FOLDABLE WHEELCHAIR

[75] Inventor: Rainer Kueschall, Allschwil, Switzerland

[73] Assignee: Kueschall Design AG, Allschwil, Switzerland

[21] Appl. No.: 685,912

[22] Filed: Jul. 22, 1996

[30] Foreign Application Priority Data

Jul. 21, 1995 [CH] Switzerland .......................... 02155/95

[51] Int. Cl.[6] ........................................ B62M 1/14

[52] U.S. Cl. .......................... 280/647; 280/42; 280/250.1; 280/304.1

[58] Field of Search .................................. 280/647, 648, 280/649, 650, 250.1, 304.1, 42

[56] References Cited

U.S. PATENT DOCUMENTS 4,101,143 7/1978 Sieber ...................................... 280/650

4,375,295 3/1983 Volin ....................................... 280/650

FOREIGN PATENT DOCUMENTS 3333570 4/1984 Germany .

*Primary Examiner*—Anne Marie Boehler

*Assistant Examiner*—Gary Savitt

*Attorney, Agent, or Firm*—Browdy and Neimark

[57] ABSTRACT

A collapsible wheelchair (10) with two lateral supports (12, 13) on which respectively a drive wheel (18, 19) and respectively a running wheel (20, 21) are fastened and which are rigidly connected by a main transverse support (34) and an auxiliary transverse support (32). The former is constituted by two legs (38, 39) connected a hinge joint, which can be arrested on each other by an arresting device. The latter has an arresting protrusion (56) hinged on one leg (38). The arresting protrusion runs up on the stop face (62) respectively located opposite it, which is a section of a stop area (64) formed on the other leg (39). At least one of the legs (38, 39) can be advanced in the direction toward the longitudinal center surface of the collapsible wheelchair (10) by an advancement device.

14 Claims, 5 Drawing Sheets

FOLDABLE WHEELCHAIR

BACKGROUND OF THE INVENTION

The invention relates to a collapsible wheelchair in accordance with the preamble of claim 1.

Collapsible or foldable wheelchairs of this type have been long known. A desire for them arose particularly with the appearance of automobiles which are more suitable for covering great distances than wheelchairs, but for which numerous locations, in particular living quarters, workplaces and public buildings, are inaccessible, so that the desire to carry along a wheelchair collapsed into a small size in the automobile and to use it in the opened state when required arose. Many demands are made on such wheelchairs which, in view of their construction, in part are contradictory. In addition to the properties which non-collapsible wheelchairs also must have, the particular desire in connection with collapsible wheelchairs is for low weight, sufficient stability in use and simple manipulation for collapsing them; in addition, it is advantageous to design the collapsible wheelchair in such a way that, depending on the necessity, in use it is either "hard", i.e. completely free of play and rigid, or "soft".

Regarding the weight, satisfactory results are obtained by following the general principles of light construction both in its shaping and in the selection of the materials used.

Regarding stability, considerable progress in comparison with traditional collapsible wheelchairs, which were a kind of a director's chair on wheels, results in that a closed frame is used. Such a frame essentially consists of two lateral supports extending in the longitudinal direction, i.e. the direction of travel of the wheelchair, which are connected by two transverse supports extending crosswise in respect to the direction of travel. Respectively one of the large drive wheels is fastened in the rear, upper area, and respectively one of the very small running wheels in the front and lower area of the lateral supports. The lateral supports are angled in the shape of a letter L and have a horizontal arm at the height of the seating surface and an oblique arm directed downward and forward from the front end of the seating surface. The transverse supports connect the lateral supports, wherein a main transverse support is disposed under the seating surface and an auxiliary transverse support is formed by the foot rest and its fastening device. The connections between the longitudinal and transverse supports must be as free of play as possible so that the frame is rigid.

The wheelchair can be folded in that the transverse supports which, in the operational state determine the distance between the longitudinal supports, can be collapsed into a position in relation to the longitudinal supports in which this distance is as short as possible. So that the collapsible wheelchairs can also be easily manipulated by the handicapped, it is necessary that the transverse supports which, during the collapsing procedure are brought into a different position, can be moved in a simple manner in relation to each other and in relation to the lateral longitudinal supports. This requires that the play necessary for this is supplied.

This shows that a core problem in connection with the construction of collapsible wheelchairs resides in designing the components required for collapsibility, which are movable in relation to each other, in such a way that in the operational position they can be fixed in place on each other as free as possible of play, and when being collapsed they are displaceable in respect to each other as free of friction as possible. In addition, as "rigid" as possible a frame must be provided, so that the moving and travelling qualities can be optimally designed.

For example, DE 33 33 570 C2 describes a collapsible wheelchair of the species mentioned at the outset, however, it has various disadvantages.

A first disadvantage of this known collapsible wheelchair consists in that either its stability in use is insufficient or that it cannot be collapsed without an effort; the hinge joint which connects the two legs of the main transverse support either has play, by means of which a sufficiently easy collapsibility, but no stability, can be achieved, or it is free of play, by means of which sufficient stability, but not an easy collapsibility can be achieved. A further result of this arrangement is that in use the collapsible wheelchair is either "soft" if there is play, or "hard" when there is no play, but that in this respect it cannot be selectively adapted to the wishes and requirements of the user. Although a possibility of such a soft/hard setting exists, it must already take place during the assembly of the collapsible wheelchair, changing it accordingly requires a partial disassembly of the collapsible wheelchair and therefore cannot be easily performed by the user or other layman.

A further disadvantage of the mentioned known collapsible wheelchair is seen in that both legs extend over the entire width of the wheelchair, wherein the one leg is disposed in a slot-like longitudinal recess of the other leg, so that the legs touch each other in two separate contact planes which are parallel to each other. This comparatively heavy construction because of the wide legs was apparently chosen in the inapplicable assumption that stability is increased if in the operating position the legs touch each other not only in one, but in two contact planes as well as over the entire width of the collapsible wheelchair. However, so that collapsibility is not overly hampered it is necessary for a defined, albeit minimal play to exist between the outer leg portions of the one leg and the other leg disposed on the inside; therefore the legs cannot be pressed together by the arresting device in such a way that they simultaneously touch along two oppositely located contact planes-in a force-transmitting manner. Since in addition the arresting device is incapable of pressing the legs together in at least one of the possible contact planes, the center leg will have the tendency of swinging back and forth between the surfaces delimiting the recess, which naturally has a negative effect on stability.

A third disadvantage of the known collapsible wheelchair relates to the arresting device by means of which the two legs are arrested in the operating position. It consists of a stop face formed by bores in the legs which are aligned in the operating position, and of an arresting body in the form of an arresting bolt which is received in the aligned bores in the arresting position. The comparatively weakly embodied arresting bolt is subjected to considerable transverse forces by which is is plastically deformed. In the course of collapsing the collapsible wheelchair it is necessary that first the release of the arresting device and subsequently the actual collapsing process take place. For releasing the arresting it is necessary to pull the said arresting bolt out of the aligned bores with a precise linear movement. Performing such a movement is not easy in any case and is made more difficult in that no ergonomically advantageous or at least sufficiently large handle is provided which can be grasped by hand when operating the arresting bolt. The extraction of the arresting bolt is further made more difficult because of its above .described plastic deformation. Performing the actual collapsing process has also been shown to be difficult, since no effective surface is provided which is designed and suitable for grasping during manual collapsing. The opening and readying for operation of the collapsible wheelchair is even more difficult because the legs have to be brought into a position in which the bores are exactly aligned, which is not quite simple, on the one hand because of the play of the hinge joints which connect the legs with each other and with the lateral supports and, on the other hand, because practically no visual control is possible. Even if the legs are successfully brought into a position in which the bores are actually aligned, and the legs are maintained in this position, the linear insertion of the arresting bolt has been shown to be difficult because of the small opening which must be exactly met, because of the insertion movement, which must be exactly linear so that the arresting bolt does not become wedged, and because of the deformation of the arresting bolt already mentioned several times.

SUMMARY OF THE INVENTION

Thus, the object of the invention is seen to be in producing a collapsible wheelchair of the type mentioned at the outset, which does not have the mentioned disadvantages and which is extremely stable in the operating position and is easily manipulated during collapsing and opening as well and offers an easy hard/soft adjustability.

This object is attained in accordance with the invention by means of the features of the characterizing part of claim 1.

Preferred further developments of the collapsible wheelchair in accordance with the invention are defined by the features of the characterizing parts of the dependent claims.

The novel collapsible wheelchair differs from the known collapsible wheelchair in accordance with the prior art in several features, which features in combination result in the attainment of the object in accordance with the invention. These features are firstly the advancement, parallel with the wheel shafts, of at least one of the legs of the main transverse supports extending at right angles with the main transverse support, secondly the legs of the main transverse support which only touch along respectively one contact surface, and thirdly the linear embodiment of the stop face extending crosswise to the movement of the arresting body, wherein the arresting body can run up on the stop face at any arbitrary location thereof. The effects achieved by these three features will be extensively described below.

As mentioned, the first feature in accordance with the invention of the novel collapsible wheelchair relates to the advancement, parallel with the wheel shafts, of at least one of the legs of the main transverse support extending at right angles with the main transverse support in the direction of the longitudinal center surface of the collapsible wheelchair; the play of the hinge joints between the lateral supports and the main transverse support and between the legs of the main transverse support can be cancelled by such an advancement. Both the stability of the collapsible wheelchair in its operating position and its easy collapsibility are increased by means of this. The improvement of the stability by preventing play is obvious and does not require further explanations; the easing of collapsibility is achieved in that the play of the hinge axes can be chosen to be comparatively generous, precisely because there is the possibility to cancel this play in the operating position by the advancement of the legs. It is also of importance that the collapsible wheelchair can be adjusted arbitrarily from "soft" to "hard" by the choice of the amount of advancement between a minimum to a maximum value, wherein the rigidity of the closed frame of a soft collapsible wheelchair is less than that of a collapsible wheelchair which is free of play and therefore "hard". In contrast to the presetting during assembly of the known collapsible wheelchair, such an adjustment is possible with the collapsible wheelchair in accordance with the invention in a simple manner by the user himself, so that it is made possible for him to adapt his collapsible wheelchair to the respective terrain conditions or other requirements by changing the mentioned adjustment. The advancement of the legs of the main transverse support furthermore makes it possible to compensate wear-related play.

The second feature in accordance with the invention relates to the embodiment and arrangement of the legs of the main transverse support. In contrast to the legs of the known collapsible wheelchair, the legs of the main transverse support of the collapsible wheelchair in accordance with the invention overlap only in a center area, where in the operating position or the arrested position they only touch along one contact plane, and they are arranged at right angles to the main transverse support. The mutual pressure of the contact surfaces of the overlapping areas of the two legs is released when the arresting device is released, so that the two legs can be easily pivoted in respect to each other because of the absence of frictional forces. It is easy to understand that this arrangement makes collapsibility easier; it is less obvious that simultaneously the stability in the operating position is increased, which will be explained in what follows. As already described, with the known collapsible wheelchair the legs are designed in such a way that their mutual contact was- intended to occur in two contact planes; however, as explained further above, such a dual contact cannot be established, so that the desired stability cannot be achieved. In contrast thereto a high stability is achieved by means of the design of the legs in accordance with the invention which, although they touch in only one contact plane, are actually pressed together free of play by the arresting device.

The third feature in accordance with the invention relates to the design of the arresting device itself. The arresting device is designed in accordance with the invention in such a way that all disadvantages relating to this and present in the known collapsible wheelchair are avoided. The stop face is designed Elongated and oriented transversely in respect to the movement of the arresting body, and the arresting body can run up on the stop face at any arbitrary location thereof. Possibly existing play which was provided or created by wear and which affects the relative position of the two legs in their longitudinal direction, i.e. crosswise to the direction of travel of the collapsible wheelchair, therefore does not make the operation of the arresting device more difficult. It is the result of this arresting which is, so to speak, independent of location, that the advantageous possibilities described further above of the advancement of the legs can be fully employed, in particular for making the collapsible wheelchair "hard" or "soft" as required, wherein the respective position of the legs is changed. A further advantage of the novel arresting device rests in that the arresting body designed as an arresting protrusion is embodied to be pivotable and can be pivoted toward the stop face or away from it; such a pivot movement can be much more easily performed than the linear pushing or pulling movement necessary for actuating the arresting bolt in accordance with the prior art. A spring device stresses the arresting protrusion, or the lever device on which the arresting protrusion is seated, in the direction toward the arresting position. A large handle is furthermore provided which eases the operation of the arresting protrusion and thus also contributes to the simpler performance of collapsing and opening. Finally, in contrast to the weak arresting bolt of the known collapsible wheelchair, which actually is only useful for positioning the legs, the arresting device of the collapsible wheelchair in accordance with the invention is sturdily designed and therefore makes it possible to press the legs together in such a way that a high degree of stability is assured.

The single-handed folding operation is additionally provided, which results in a further considerable operating advantage.

In summary it can therefore be stated that the collapsible wheelchair in accordance with the invention advantageously differs from the known collapsible wheelchair both in respect to its stability in use and in respect to its easy in folding. The advantages which are sought by the advancement crosswise in respect to the direction of travel can be achieved if an advancement device is provided for one of the two legs. However, given the very short distances over which such advancement devices must apply their effects, as well as for creating a symmetrical advancement, it is advantageous to provide advancement devices for both legs.

The advancement devices can be embodied such that they have an advancement body which acts on the leg crosswise in respect to the direction of travel or in its longitudinal direction by being displaceable in relation to the lateral support on which the leg is hinged.

The advancement advantageously is continuous in that the advancement body can be displaced by means of an advancement element over a surface which is wedge- or helically-shaped.

In a preferred embodiment the advancement body is received in an opening of a plate-shaped shoulder of the lateral support and is arranged in the direction of travel, wherein its surface facing the leg rests against the latter. On the outside or the side facing away from the leg, the opening is closed by a cover plate rigidly fastened on the shoulder. The advancement element in the shape of a screw or eccentric disk is rotatably received in this cover plate.

In accordance with the invention, the stop area is disposed on a face of one of the legs extending in the advancement direction, wherein the section of the stop area, which respectively is located opposite the arresting protrusion and on which the arresting protrusion runs up, acts as the actual stop face. Since the arresting protrusion always finds a suitable stop face, independently of the location, so to speak, on which it can run up, it is not necessary to provide an adjustment possibility for the arresting device for locally adapting it to the amount of advancement of the legs or the selected setting of the leg length, which will be discussed further on below. An at least level outer face of the leg is customarily used as the stop area.

The pivotable arresting protrusion or the level device on which the arresting protrusion is disposed, is hinged via an arresting shaft on the leg not provided with he stop area. Although other structural designs are also conceivable, the best arresting effect is obtained when the arresting axis is disposed parallel with the main transverse support and thus crosswise to the direction of travel.

In its effective position, when the collapsible wheelchair is in the operating position, the arresting protrusion must be fixed on the stop face. This is accomplished in the simplest way in that the lever device containing the arresting protrusion is prestressed toward the effective position, which is possible in an advantageous manner by means of a spring device. In a further development of the invention the lever device can be embodied as a single-handed actuation and then represents a further advantageous simplification of the operation of the folding mechanism.

It has already been mentioned that the length of the main transverse support can be adjusted, by means of which it is possible to change the width of the collapsible wheelchair for the purpose of adapting it to the needs of its user. Although for saving weight the two legs of the main transverse support do not extend over the entire width of the collapsible wheelchair, their ends disposed in the area of the longitudinal center plane of the collapsible wheelchair overlap, wherein this overlapping area is greatest when a minimal width is desired, and is reduced when larger width are set. The adjustment of the width does not take place continuously, since an elaborate telescope-like extendible device would be required on at least one of the transverse supports, and it is possible also with different means to perform an adjustment in sufficiently small stages or steps, which will be described in what follows. At least one of the two legs, which are connected with each other via a hinge joint, has not only one bore for receiving the hinge shaft, but a plurality of axis-parallel bores. These bores are distributed at mutual distances over an area of the leg intended for overlapping with the other leg. One of these bores is selectively brought into an aligned arrangement with the bore of the other leg and a bolt is inserted into the hinge shaft. It is obvious that it is possible to increase the number of adjustments when the second leg also has a plurality of bores, which are not to be arranged with the same spacing as the bores of the first leg.

A device with an adjusting nut is advantageously employed for the fine setting of the play of the hinge shaft. Since it has a tendency of becoming displaced or even to come loose because of the many collapsing moves which the hinge joint undergoes, a retaining device is advantageously provided for fixing the adjusting nut in its set position. For example, it is possible to select an adjustment nut which is secured in a known manner by means of a threaded pin which is axis-parallel with it and engages one of the concavities of the adjustment nut.

With conventional collapsible wheelchairs the legs or the corresponding scissor-like components move in a vertical plane during the collapsing process, i.e. they perform pivot movements around horizontal pivot shafts. Such a construction of the legs or the corresponding scissors-like components is also possible in connection with the collapsible wheelchair in accordance with the invention; however, it was shown to be considerably more advantageous to arrange the legs on top of each other and at right angles with the main transverse support, so that in the course of the collapsing process they move in a horizontal plane, which is synonymous with their rotating around vertical pivot shafts. The advantage of the vertically arranged shafts is essentially seen in that they are exposed to a lesser degree to transverse forces and thus to bending, whereby jamming of or interference with the pivot movements and thus of the collapsing process is prevented. So that the collapsible wheelchair is as stable as possible, it is advantageous if its main transverse support, which contributes considerably greatly to the weight, is disposed as low as possible, i.e. below the seating surface, as is also the case with the collapsible wheelchair in accordance with DE 33 33 570 C2; however, there the main transverse support is disposed below the rear area of the seating surface, so that the axis through the center of gravity is bounded by the lines which connect the drive wheels and the running wheels. With the collapsible wheelchair in accordance with the invention stability has been further increased by displacing the main transverse support forward, so that—viewed in the direction of travel—it is located approximately below the center of the seating surface and therefore at least approximately below the axis through the center of gravity. The steerability of the novel collapsible wheelchair is also improved by this.

The already mentioned as well as further advantages of the collapsible wheelchair in accordance with the invention will be explained in detail below by means of a preferred exemplary embodiment, making reference to the drawings. Shown are in:

It should be stated in advance that the collapsible wheelchair is described in the folded-open state, i.e. In the operating state, and that terms such as "up", "down", "left", "right", "front", "back"always relate to a collapsible wheelchair standing on a horizontal base and viewed in the direction of moving.

DETAILED DESCRIPTION OF THE INVENTION

Figure 1:
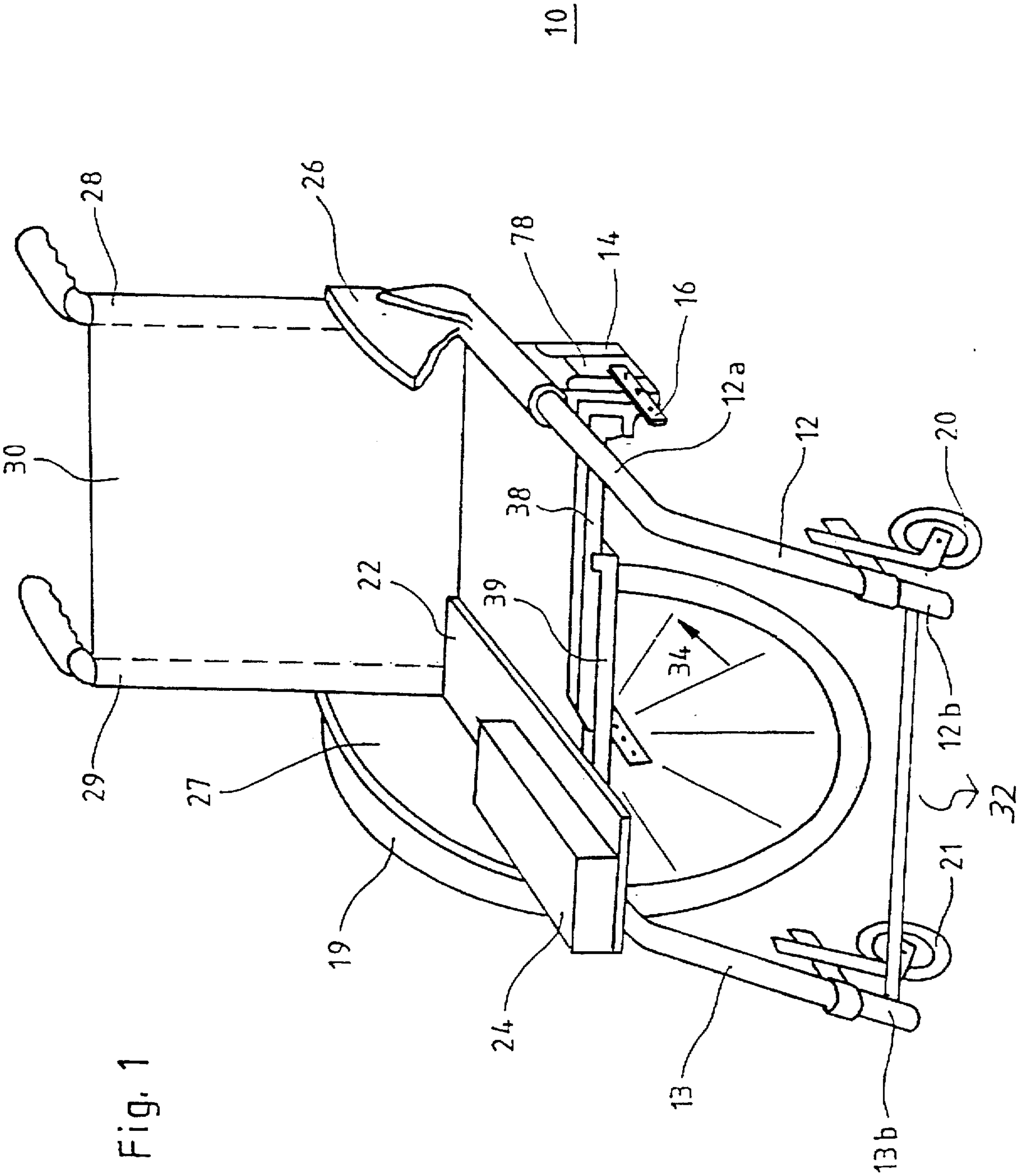
FIG. 1, a diagram in a simplified, partially schematic representation of a collapsible wheelchair in accordance with the invention, several parts of which have been cut away.
Figure 2:
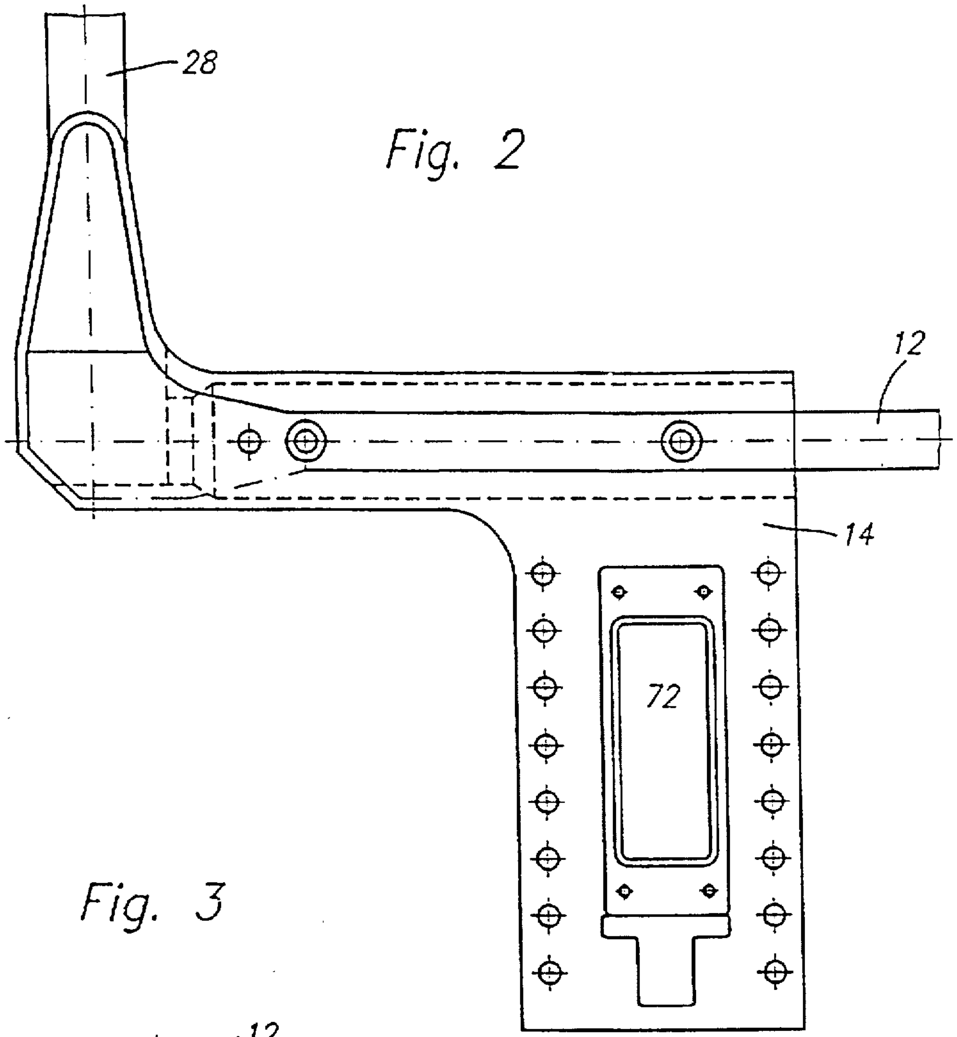
FIG. 2, a lateral view from the outside of a part of a left lateral support disposed in the longitudinal direction or direction of travel of the collapsible wheelchair represented in FIG. 1.
Figure 3:
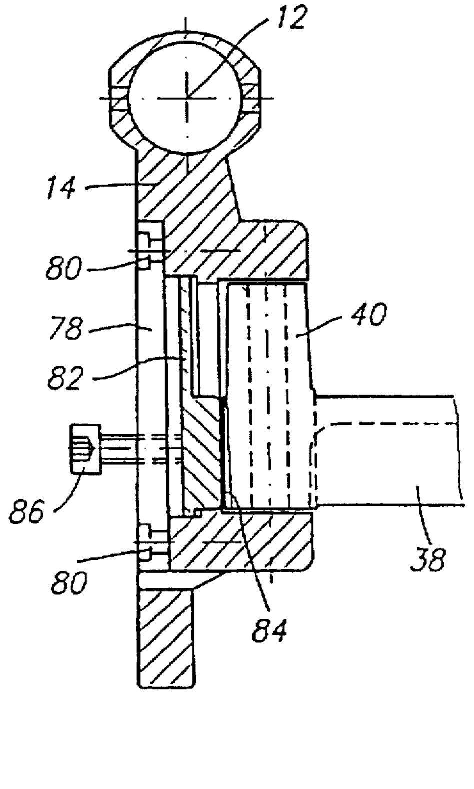
FIG. 3, the lateral support represented in FIG. 2 in vertical longitudinal section.
Figure 4:
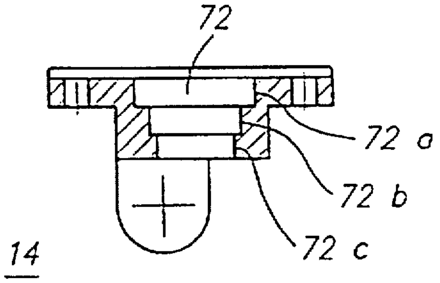
FIG. 4, the lateral support represented in FIGS. 1 and 2 in a sectional view along the line 4—4 of FIG. 3.
Figure 5:
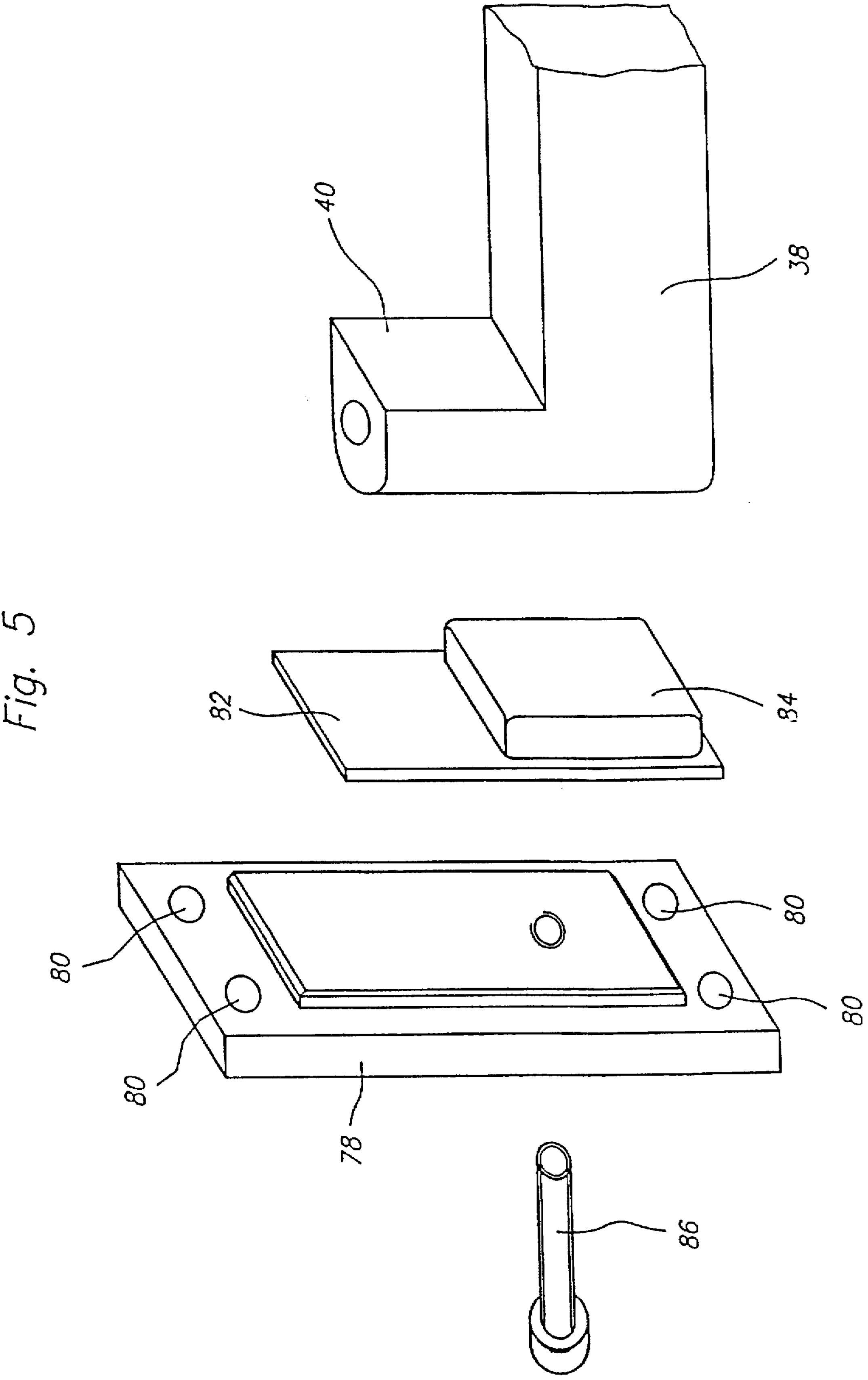
FIG. 5, a diagram in a simplified exploded view of the parts of the advancement device disposed in the lateral support, namely a section of the lateral support, the advancement body and the cover plate, as well as the left leg of the main transverse support.

The collapsible wheelchair represented in FIG. 1, hereinafter identified as wheelchair 10 for short, has a left lateral support 12 and a right lateral support 13. The two lateral supports 12, 13 are approximately L-shaped and respectively have horizontal arms **12*a*, 13*a* and respective arms 12*b*, 13*b*** pointed obliquely to the front and downward.

In its rear area the horizontal arm **12*a* of the left lateral support 12 has a vertical, plate-shaped shoulder identified as the wheel support 14, on which a drive wheel 18 is fastened by means of an adapter plate 16; in a symmetrical arrangement a drive wheel 19 is fastened on a shoulder 15 of the right lateral support 13 by means of a further adapter plate 17**.

The wheel supports 14, 15 as well as the adapter plates 16, 17 have a plurality of bores. This provides many opportunities for fastening, on the one hand, the adapter plates 16, 17 on the wheel supports 14, 15 and, on the other hand, the drive wheels 18, 19 on the adapter plates 16, 17, so that the geometry of the wheelchair 10 can be adapted to the requirements of various users and possibly to changing requirements of a particular user.

In a conventional manner the drive wheels 18, 19 are fastened via knockout shafts with spring-actuated fastening elements and can therefore be disassembled in a simple manner for transporting the wheelchair 10, for example in an automobile, whereupon the remaining portion of the wheelchair 10, now considerably less bulky, can be lifted and taken care of much more simply.

Running wheels 20, 21, whose diameters are considerably less than the diameters of the drive wheels 18, 19, are fastened in the conventional manner in the lowermost area of the oblique arms **12*b*, 13*b***.

A foldable cloth piece constituting a seating surface 22, on which a seat cushion 24 is fastened with the help of a Velcro(R) tape, is disposed on the horizontal arms **12*a*, 13*a* of the lateral supports 12, 13**.

Horizontal, thin strips 26 are disposed on both sides of the seating surface 22 laterally in a horizontal arrangement as clothing protection.

Struts 28, 29 extend from the rear area of the horizontal arms **12*a*, 13*a* approximately vertically upward, between which another cloth piece forming a backrest 30 is disposed, which can also be cushioned like the seating surface 22 by a cushion, not shown. The angle which the vertical struts 28, 29 form with the horizontal arms 12*a*, 13*a* of the lateral supports 12, 13 is adjustable, which again is used for adapting the geometry of the wheelchair 10** to the respective requirements.

The lateral supports 12, 13 which are disposed in a plane parallel with the direction of travel, are connected by means of two transverse supports, namely an auxiliary transverse support 32 and a main transverse support 34: by means of which a closed, comparatively rigid frame is formed. The auxiliary transverse support 32 is at the height of the lower ends of the oblique arms **12*b*, 13*b* of the lateral supports 12, 13 and is combined in the customary way with a foot support not shown which is designed to be pivotable. The main transverse support 34 is disposed centered under the seating surface 22, i.e. at least approximately below the axis through the center of gravity of the wheelchair 10** loaded with a user; a high degree of stability and easy steerability of the wheel chair is achieved by this arrangement.

Figure 8:
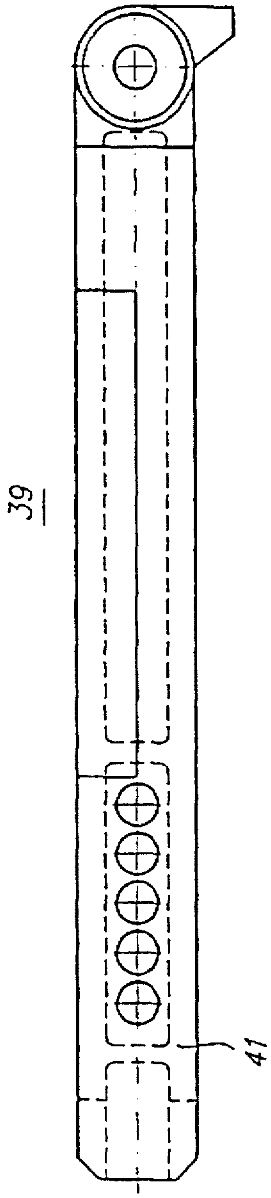
FIG. 8, the right leg of the main transverse support shown in FIG. 6 in a view from above.
Figure 6:
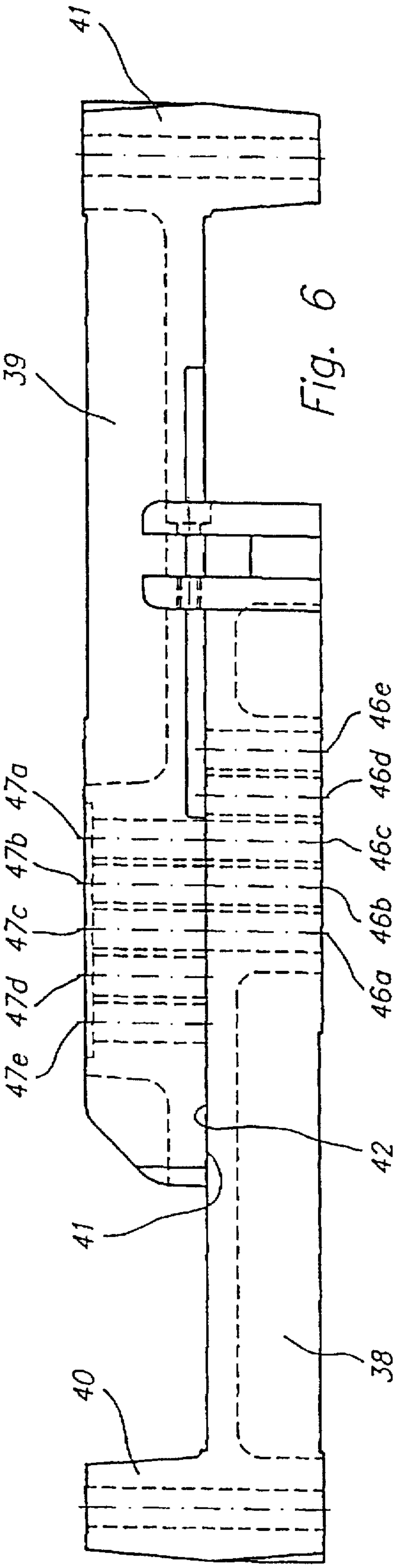
FIG. 6, the main transverse support of the collapsible wheelchair represented in FIG. 1 in a lateral view from behind.
Figure 7:
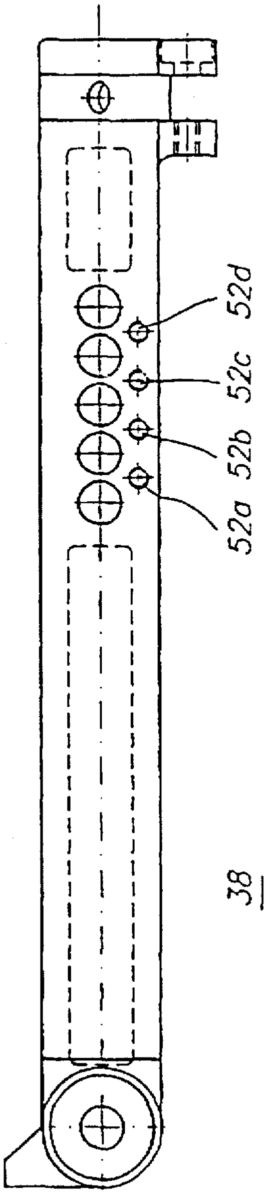
FIG. 7, the left leg of the main transverse support shown in FIG. 6 in a view from above.

In accordance with FIGS. 6 to 8, the main transverse support 34 essentially consists of two legs 38, 39, hinged at approximately right angles. The left leg 38 has a bearing body 40 for receiving a vertical pivot shaft, not shown, by means of which it is hinged on the left wheel support 14 and in this way is indirectly fastened on the left lateral support 12; in a corresponding manner the right leg 39 has a bearing body 41 for receiving a pivot shaft, also not shown, by means of which it is hinged on the right wheel support 15 and in this way is indirectly fastened on the right lateral support 13. The cross sections of the elongated portions of the legs 38, 39 extending below the seating surface 22 are essentially rectangular, wherein various cutouts have been made for reducing the weight and for structural reasons. The legs 38, 39 overlap with their ends located opposite the bearing bodies 40, 41 in the area of the longitudinal center surface of the wheelchair.

With its lower surface **39*u*, the right leg 39 rests on the top surface 38*o* of the left leg 38, so that the surfaces 38*o*, 39*u*** constitute the touching flat and horizontal contact surfaces of the legs 38, 39.

The overlapping ends of the legs 38, 39 of the main transverse support 34 are hingedly connected with each other in the form of a hinge joint and can be pivoted relative to each other around a vertical hinge shaft 44 out of their parallel position which they take up in the operating state of the wheelchair 10, into a position of rest, not shown, which they take up when the wheelchair 10 is collapsed. Therefore, in the operating state the legs 38, 39 enclose right angles with the lateral supports 12, 13, while in the collapsed state they are oriented almost parallel with the lateral supports 12, 13.

Figure 10:
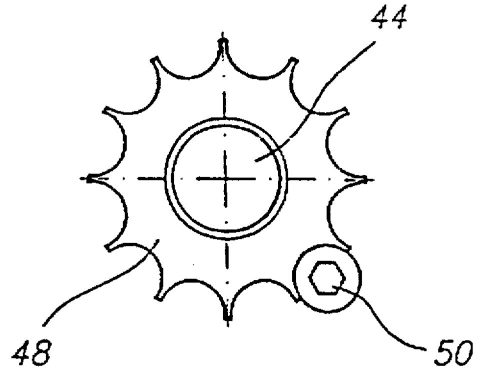
FIG. 10, a detail of the mutual fastening of the two legs of the main transverse support.

For adaptation to changing requirements, the width of the wheelchair 10 can be adjusted. For this purpose the auxiliary transverse support 12 and the main transverse support 34 are designed in such a way that their length is selectively changeable, wherein usual and not further described constructive steps are provided for adjusting the auxiliary transverse support 32. Adjustability of the main transverse support is achieved in that the overlapping area of the legs 38, 39 is lengthened or shortened. So that this becomes possible, each of the two legs 38, 39 has a plurality of, in the present case five, parallel bores *46a* to *46e* and *47a* to *47e*. Depending on the desired width of the wheelchair 10, respectively-one of the bores *46a* to *46e* of the leg 38 is aligned with the suitable one of the bores *47a* to *47e* of the leg 39, and the hinge axis 44 is disposed in the selected coaxial bores, in the present case *46b*, *47b*. Fastening of the hinge shaft 44 and setting of its play takes place by means of a screw device, wherein an adjusting nut 48, represented in FIG. 10, is used for fine adjustment of the play. The adjusting nut 48 is designed in such a way that it is secured by means of a retaining screw 50, which can be screwed into one of four bores *52a* to *52d*, in the present case *52b* or *5c*, depending on the position of the adjusting nut 48. The displacement or loosening of the adjusting nut 48 is prevented by means of the retaining screw 50, something which otherwise would have to be feared because of the relative movement of the legs 38, 39 in the course of folding the wheelchair 10.

Figure 9:
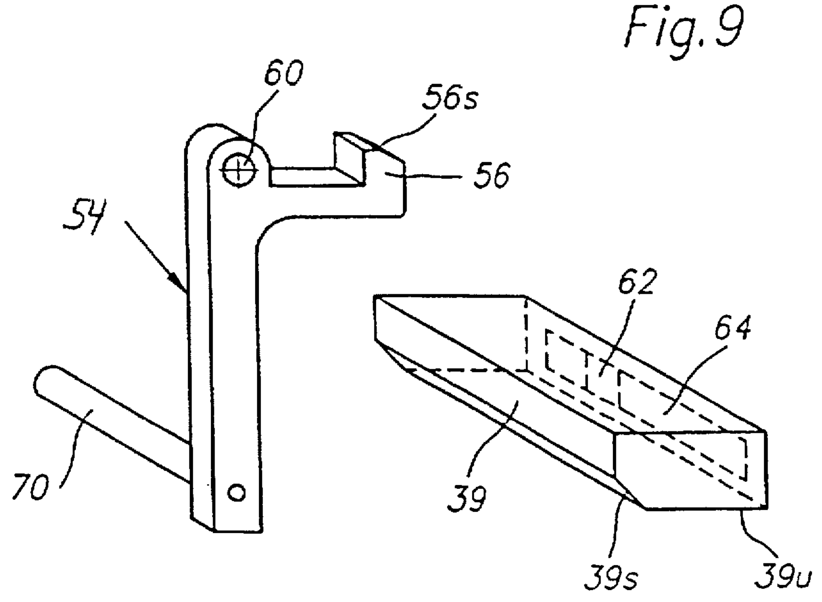
FIG. 9, a diagram of the arresting device for the mutual arresting of the legs represented in FIGS. 7 and 8 of the main transverse support represented in FIG. 6 with the single-handed actuation device not shown.

In the operating position of the wheelchair 10, when they take up the position shown in FIGS. 6 to 8, the two legs 38, 39 of the main transverse support 34 are fastened on each other. An arresting device is provided for this purpose, wherein in the arrested state an arresting body rests on a stop face by means of the action of a locking element. With the instant wheelchair 10 the arresting body is constituted by an arresting protrusion 56 disposed on a lever device 54. The lever device 54 is hinged on a shoulder 58 of the left leg 38 and is pivotable around a horizontal arresting shaft 60. The stop face 62 cooperating with the arresting protrusion 56 in the arrested state is formed by a section, located opposite the arresting protrusion 56, of an elongated stop area 64, which extends along the rear vertical lateral surface *39b* of the leg 39. The stop face 62 and the stop area 64 are indicated by dashed lines in FIG. 9, but in actuality are not visible on the leg 39, except in case of a certain slight wear because of frequent actuation of the arresting device. The arresting protrusion is prestressed toward the respective stop face 62 by means of a spring device 68 represented in FIG. 9. In the assembled state the spring device 68 is received in a recess of the left leg 38, which is not shown in FIG. 9. However, an ergonomically advantageous handle 70 can be clearly seen in FIG. 9, by means of which the arresting device can be operated in an easy manner. This handle can also be advantageously embodied as a so-called single-handed actuation of the folding device, which is not shown for the sake of clarity.

The purpose of the elongated design or the stop area 64 is to make a stop face 62, which is not laterally limited, available to the arresting protrusion 56 at any location where it might be. By means of this the mutual arresting of the legs 38, 39, which is necessary when readying the wheelchair 10 for use, is eased to a high degree, as had already been extensively explained above. The just described arrangement is provided because, depending on the set width of the wheelchair 10 and depending on the advancement of the legs 38, 39, which will be discussed later, the arresting protrusion 56 can take up a position which can change over a defined distance along the width of the wheelchair 10. It is also pointed out that the lower rear edge of the right leg 39 has a bevel *39s*, which has at least the same inclination as the forward and downward oriented bevel *56s* of the arresting protrusion 56. Firstly, it is achieved by means of this that there are no fitting problems between the right leg 39 and the shoulder 58 of the left leg 38, and secondly, that in the course of folding the wheelchair 10 open, the bevel *56s* of the arresting protrusion 56 comes into contact with the bevel *39s* of the leg 39, which eases pivoting of the lever device 54 in a clockwise direction in FIG. 9, which must be performed for the mutual arresting of the legs 38, 39.

The already mentioned advancement of the legs 38, 39 parallel with the axis of rotation of the wheels or in the direction toward the longitudinal center surface of the wheelchair 10 will be described more exactly in what follows. As mentioned at the outset, opposing requirements are made on the wheelchair 10. On the one hand, it should be as rigid as possible in the operating position, so that a connection of the various components which is as free of play as possible is desired. On the other hand, the wheelchair 10 should be collapsible without a large expenditure of force, for which purpose a comparatively large play must be provided in the said connections. This relates in particular to the hinged connections of the legs 38, 39, on the one side with the lateral supports 12 and 13, and on the other side with the hinge joint in the main transverse support 34 by means of which its legs 38, 39 are connected. In accordance with the invention an advancement device is provided for reducing the play of the pivot shafts, by means of which the legs 38, 39 can be advanced toward each other toward the longitudinal central plane of the wheelchair 10.

The structural design and the functioning of the advancement device represented in FIGS. 2 to 5 for the left side of the wheelchair 10 are described in more detail. An approximately rectangular opening 72 can be seen, which is disposed in the wheel support 14 and extends over two steps *72a*, *72b* between the inner surface 74 and the outer surface 76 of the wheel support 14. The opening 72 is closed by means of a cover plate 78 resting on the step *72a*, which is rigidly connected with the wheel support 14 by means of screws, not shown, for which four bores 80 are provided. A plate 82, resting on the next step *72b*, is located in the opening 72 inside the vertical cover plate 78 and has an advancement body 84 formed on it. The plate 82 of the advancement body 84 or the advancement body 84 are acted upon by an adjusting screw 86 screwed into the cover plate 78. By means of this the advancement body 84 pushes the bearing body 40, which rests against it, of the left leg 38 toward the right or in the direction of the leg 39 or the center of the wheelchair 10. A corresponding advancement device is also provided in the right wheel support 15, but with the difference that there the adjusting screw corresponding to the adjusting screw 86 and the advancement body corresponding to the advancement body 84 are disposed in the upper area of the opening, while the adjustment screw 86 and the advancement body 84 of the represented left advancement device are located in the lower area of the opening 72. The reason for the asymmetrical embodiment of the otherwise symmetrical advancement device is that the adjusting screw 84 of the left advancement device is intended to be aligned with the longitudinal axis of the left leg 38 of the main transverse support 34, so that the advancement can take place in an efficient manner. Since the right leg 39 of the main transverse support 34 lies above the left leg 38, the right advancement device is accordingly also disposed higher than the left advancement device, so that in any case the advancement screw is aligned with the longitudinal axis of its leg. However, it is nevertheless possible to use identical openings, cover plates and plates with an advancement body formed thereon for the left and the right advancement device, wherein the edges of the cover plate and the plate with the advancement body which are on top in the left advancement device are disposed on the bottom in the right advancement device.

I claim:

1. A collapsible wheelchair (10) with two lateral supports (12,13), a drive wheel and a running wheel fastened to each lateral support of the wheelchair, the drive wheels having an axis of rotation, and wherein the two lateral supports are rigidly connected by means of a horizontal main transverse support (34) and an auxiliary transverse support (32), wherein the main transverse support (34) is constituted by two legs (38,39), which are hinged on the lateral supports (12,13) and connected to each other by means of a hinge joint, and wherein the two legs can be arrested with respect to each other by means of an arresting device having a stop face (62) and an arresting body (56), and wherein the legs (38,39) touch each other along a contact surface, and at least one of the legs can be advanced relative to the other leg by means of an advancement device in a direction parallel with the axis of rotation of the drive wheels, and wherein one of the two legs (38) has the arresting body embodied as a pivotable arresting protrusion (56), while the other of the two legs (39) has an elongated stop area (64) extending in the advancement direction, and wherein a section of the stop area (64) located opposite the arresting protrusion constitutes the stop face (62).

2. The collapsible wheelchair (10) in accordance with claim 1, characterized in that the two legs (38,39) are disposed substantially parallel to the axis of rotation of the drive wheels.

3. The collapsible wheelchair (10) in accordance with claim 1, characterized in that the other of the two legs (38,39) also has an advancement device.

4. The collapsible wheelchair (10) in accordance with claim 1, characterized in that the advancement device has an advancement body (84) acting on its respective leg (38,39), which can be displaced in relation to the lateral support (12,13).

5. The collapsible wheelchair (10) in accordance with claim 4, characterized in that the advancement body (84) is continuously displaceable by means of a wedge- or spiral-shaped advancement element (86).

6. The collapsible wheelchair (10) in accordance with claim 4, characterized in that the advancement body (84) is received in a opening (72) of a shoulder (14, 15) of the lateral support (12, 13), which opening (72) is covered by a cover plate (78) rigidly fastened on the shoulder (14, 15), by which the advancement element (86) is received.

7. The collapsible wheelchair (10) in accordance with claim 1, characterized in that the stop area (64) is a preferably flat outer surface (39*v*) of one of the legs (39), which is oriented parallel with the axis of rotation of the drive wheels (18, 19).

8. The collapsible wheelchair (10) in accordance with claim 1, characterized in that the arresting protrusion (56) is hinged on an arresting shaft (60) disposed on one of the legs (38) and extending in the longitudinal direction of the leg (39).

9. The collapsible wheelchair (10) in accordance with claim 1, characterized in that the arresting protrusion (56) is prestressed in the direction toward the stop face (62).

10. The collapsible wheelchair (10) in accordance with claim 1, characterized in that at least one of the legs (38, 39) has a plurality of bores (46*a* to 46*e*) distributed at mutual distances over its length, of which a bore (46*c*) can be selectively aligned with a bore (47*c*) of the other leg (39) in order to set the length of the main transverse support (34).

11. The collapsible wheelchair (10) in accordance with claim 1, characterized in that for the fine adjustment of the play of the hinge shaft (44) an adjusting nut (48) is disposed in the hinge joint connecting the legs (38, 39) and can be secured in its set position by means of a retaining device (50).

12. The collapsible wheelchair (10) in accordance with claim 1, characterized in that the legs (38,39) are pivotable about vertically oriented pivot shafts.

13. The collapsible wheelchair (10) in accordance with claim 1, characterized in that the main transverse support (34) connects center areas of horizontal arms (12*a*, 13*a*) of the longitudinal supports (12, 13), so that the main transverse support is disposed below the axis through the center of gravity of the wheelchair (10) when loaded.

14. The collapsible wheelchair (10) in accordance with claim 1, characterized in that the two legs (38, 39) can be fixed in place by means of an arresting device operable with one hand.

* * * * *